(12) United States Patent
Kim et al.

(10) Patent No.: US 9,673,444 B2
(45) Date of Patent: Jun. 6, 2017

(54) METHOD OF MANUFACTURING ELECTRODE FOR LITHIUM SECONDARY BATTERY AND ELECTRODE MANUFACTURED USING THE SAME

(71) Applicant: LG Chem, Ltd., Seoul (KR)

(72) Inventors: Daehong Kim, Daejeon (KR); Jae Hyun Lee, Daejeon (KR); Tae Jin Park, Daejeon (KR)

(73) Assignee: LG Chem, Ltd. (KR)

( * ) Notice: Subject to any disclaimer, the term of this patent is extended or adjusted under 35 U.S.C. 154(b) by 223 days.

(21) Appl. No.: 14/483,569

(22) Filed: Sep. 11, 2014

(65) Prior Publication Data

US 2014/0377658 A1 Dec. 25, 2014

Related U.S. Application Data

(63) Continuation of application No. PCT/KR2013/003214, filed on Apr. 17, 2013.

(30) Foreign Application Priority Data

Apr. 17, 2012 (KR) .................. 10-2012-0039451

(51) Int. Cl.
| | |
|---|---|
| *H01M 4/131* | (2010.01) |
| *H01M 4/525* | (2010.01) |
| *H01M 4/52* | (2010.01) |
| *H01M 4/04* | (2006.01) |
| *H01M 4/505* | (2010.01) |
| *H01M 10/0525* | (2010.01) |
| *H01M 4/66* | (2006.01) |
| *C25D 7/06* | (2006.01) |
| *H01M 4/485* | (2010.01) |
| *H01M 4/50* | (2010.01) |
| *H01M 4/1391* | (2010.01) |
| *H01M 10/052* | (2010.01) |

(52) U.S. Cl.
CPC .......... *H01M 4/131* (2013.01); *C25D 7/0692* (2013.01); *H01M 4/0404* (2013.01); *H01M 4/0471* (2013.01); *H01M 4/1391* (2013.01); *H01M 4/485* (2013.01); *H01M 4/502* (2013.01); *H01M 4/505* (2013.01); *H01M 4/523* (2013.01); *H01M 4/525* (2013.01); *H01M 4/661* (2013.01); *H01M 4/667* (2013.01); *H01M 10/0525* (2013.01); *H01M 10/052* (2013.01); *H01M 2220/20* (2013.01); *Y02E 60/122* (2013.01); *Y02P 70/54* (2015.11)

(58) Field of Classification Search
CPC ...... H01M 4/131; H01M 4/525; H01M 4/523; H01M 4/0471; H01M 4/505; H01M 4/502; H01M 4/485; H01M 10/0525
See application file for complete search history.

(56) References Cited

U.S. PATENT DOCUMENTS

| | | |
|---|---|---|
| 2006/0073388 A1 | 4/2006 | Harada et al. |
| 2008/0212260 A1 | 9/2008 | Roh et al. |
| 2008/0241689 A1 | 10/2008 | Takami et al. |
| 2011/0111290 A1 | 5/2011 | Uchida et al. |
| 2011/0200884 A1* | 8/2011 | Uchida .................. H01M 4/139 429/245 |
| 2012/0021276 A1 | 1/2012 | Takatsuka et al. |

FOREIGN PATENT DOCUMENTS

| | | | |
|---|---|---|---|
| CN | 102400102 A | 4/2012 | |
| JP | 4-206620 B2 | 7/1992 | |
| JP | 11260350 | 9/1999 | |
| JP | 2000156328 A | 6/2000 | |
| JP | 2003157852 A * | 5/2003 | ............ H01M 4/131 |
| JP | 2006107812 A | 4/2006 | |
| JP | 2007250376 A | 9/2007 | |
| JP | 2008282797 A | 11/2008 | |
| JP | 2012-028033 A | 2/2012 | |
| JP | 2012033279 A * | 2/2012 | ........ H01M 10/0525 |
| KR | 20050030441 A | 3/2005 | |

OTHER PUBLICATIONS

PBFC-2 2nd International Conference on Polymer Batteries and Fuel Cells, Jun. 16, 2005, Reale, et al. "Safe, Low Cost and Sustainable High Voltage Lithium Ion Poymer Batteries." Abstract #123.
International Search Report for Application No. PCT/KR2013/003214 dated Jul. 9, 2013.

* cited by examiner

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a method of manufacturing an electrode for a secondary battery including an electrode mixture including an electrode active material, binder and conductive material coated on a current collector. Provided are a method including surface-treating the current collector such that an aluminum oxide ($Al_2O_3$) layer of 40 nm or less is formed on the current collector so as to enhance adhesion between the electrode mixture and the current collector, and an electrode for a secondary battery manufactured using the same.

19 Claims, No Drawings

METHOD OF MANUFACTURING ELECTRODE FOR LITHIUM SECONDARY BATTERY AND ELECTRODE MANUFACTURED USING THE SAME

CROSS-REFERENCE TO RELATED APPLICATIONS

The present application is a continuation of International Application No. PCT/KR2013/003214 filed on Apr. 17, 2013, which claims priority from Korean Patent Application No. 10-2012-0039451 filed on Apr. 17, 2012, in the Korean Intellectual Property Office, the disclosures of which are incorporated herein by reference.

TECHNICAL FIELD

The present invention relates to a method of manufacturing an electrode for a secondary battery including an electrode mixture including an electrode active material, binder and conductive material coated on an Al current collector and an electrode manufactured using the same and, particularly, to a method of manufacturing an electrode for a secondary battery that includes surface-treating the current collector to form an aluminum oxide ($Al_2O_3$) layer of 40 nm or less on the current collector, resulting in enhanced adhesion between the electrode mixture and the current collector and an electrode manufactured using the same.

BACKGROUND ART

As mobile device technology continues to develop and demand therefor continues to increase, demand for a secondary battery as energy sources is rapidly increasing. Among these a secondary battery, lithium a secondary battery, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium a secondary battery having high energy density, high discharge voltage and output stability is actively underway and some lithium a secondary battery are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolyte.

In such lithium a secondary battery, charging and discharging processes are performed while lithium ions of a cathode are repeatedly intercalated into and deintercalacted from an anode. Although there are differences in theoretical capacities of batteries according to kinds of electrode active materials, in most cases, charge and discharge capacities are deteriorated as cycles proceed.

Such phenomenon is mainly attributed to non-functioning of active materials due to separation of electrode active material components or separation between an electrode active material and a current collector by change in volume of an electrode occurring as charging and discharging of a battery proceed. In addition, in the intercalation and deintercalation processes, lithium ions intercalated into an anode are unable to be properly deintercalated therefrom and thus an anode active site is reduced and, accordingly, charge and discharge capacities and lifespan characteristics of a battery are deteriorated as cycles proceed.

With regard to this, binders provide adhesion between electrode active materials and adhesion between an electrode active material and an electrode current collector and suppress volumetric expansion according to charging and discharging of a battery, which is an important factor determining battery performance.

However, when a large amount of binder is used during manufacture of a secondary battery to enhance adhesion, the amount of a conductive material or an electrode active material relatively decreases and thus conductivity of an electrode is reduced or battery capacity is reduced. In addition, if an electrode slurry is too dilute, it is not easy to perform coating of an electrode.

Therefore, there is an urgent need to develop technology of using an appropriate amount of binder and imparting high adhesion between an electrode active material and a current collector, whereby secondary battery performance may be enhanced.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when an Al current collector is surface-treated so as to form an aluminum oxide ($Al_2O_3$) layer of 40 nm or less and then is coated with an electrode mixture, desired effects may be achieved, thus completing the present invention.

Technical Solution

In accordance with one aspect of the present invention, provided is a method of manufacturing an electrode for a secondary battery including an electrode mixture including an electrode active material, binder and conductive material coated on an aluminum current collector, the method including surface-treating the current collector to form an aluminum oxide ($Al_2O_3$) layer of 40 nm or less and thus being characterized by enhanced adhesion between the electrode mixture and the current collector.

Generally, since aluminum reacts with oxygen in the air to form aluminum oxide ($Al_2O_3$), an Al current collector forms a natural aluminum oxide ($Al_2O_3$) layer of 1 to 5 nm in the air.

Such an aluminum oxide layer prevents corrosion of an Al current collector which may occur during operation of a battery cell. Further, since the aluminum oxide layer is a porous material, a contact area between an electrode mixture and an electrode widens and, as such, secondary battery performance such as a charge-discharge cycle characteristic may be improved.

However, since the aluminum oxide ($Al_2O_3$) layer may be, partially, decomposed during high-voltage charge-discharge processes of a battery, formation of a thicker aluminum oxide layer is required.

Therefore, the present invention includes surface-treating current collector so as to form an Al current collector having a thickness of particularly 10 to 40 nm, more particularly 20 to 30 nm Such a thickness of an aluminum oxide layer is in a range in order to enhance adhesion to an electrode mixture and thus to improve a battery performance. When an aluminum oxide layer is too thick, adhesion to an electrode mixture is enhanced but ionic conductivity is reduced. Whereas, when an aluminum oxide layer is too thin, adhesion to an electrode mixture, which is important in the present invention, may be reduced.

A method of forming an aluminum oxide layer by surface-treating an Al current collector is not specifically limited so long as the method is known in the art. However, the aluminum oxide layer having a specific thickness as in the present invention may be performed by thermal treatment or electrical treatment.

For an embodiment, the thermal treatment may be performed at 100 to 500° C. for 0.5 to 5 hours under an oxygen atmosphere of 1 to 150 mTorr, particularly 200 to 450° C. for 1 to 3 hours under an oxygen atmosphere of 30 to 100 mTorr.

The temperature, pressure and time ranges defined above were determined to obtain an aluminum oxide layer having a desired thickness according the present invention. Therefore, temperature, pressure and time conditions which are not included in the range of the present invention are not preferable since when temperature, pressure and time conditions are outside the ranges, desired effects may not be exhibited.

In another embodiment, the electrical treatment may be performed at an applied voltage of 30 to 300 V for 1 to 5 hours under a current density of 1 to 200 mA/cm$^2$. The electrical treatment may be performed according to an electrode oxidation manner by applying voltage to a current collector, or may be performed by soaking a current collector in an acidic solution such as a 10 to 20% sulfuric acid.

Thermal treatment or electrical material treatment conditions may be determined to form an aluminum oxide layer, having a thickness defined in the present invention, on a surface of an Al current collector.

The electrode may be a cathode or anode, or a cathode and anode.

The cathode for a secondary battery is manufactured by drying and pressing after coating a mixture including a cathode active material, conductive material and binder on a cathode current collector. As needed, a filler may be further added to the mixture.

The cathode current collector is manufactured to, generally, a thickness of 3 to 500 μm. The cathode current collector is not particularly limited so long as it does not cause chemical changes in the fabricated battery and has high conductivity. For example, the cathode current collector may be made of aluminum as described above.

The cathode active material may include a spinel-structure lithium metal oxide represented by Formula 1 below:

$$Li_xM_yMn_{2-y}O_{4-z}A_z \quad (1)$$

wherein $0.9 \leq x \leq 1.2$, $0 < y < 2$, and $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

More particularly, the lithium metal oxide may be represented by Formula 2 below:

$$Li_xNi_yMn_{2-y}O_4 \quad (2)$$

wherein $0.9 \leq x \leq 1.2$ and $0.4 \leq y \leq 0.5$; the lithium metal oxide may be, more particularly, $LiNi_{0.5}Mn_{1.5}O_4$ or $LiNi_{0.4}Mn_{1.6}O_4$.

However, the lithium metal oxide may further include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}Mn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides having the formula $LiNi_xMn_{2-x}O_4$ where $0.01 \leq x \leq 0.6$; $LiMn_2O_4$ where some of the Li atoms are substituted with alkaline earth metal ions; disulfide compounds; and $Fe_2(MoO_4)_3$.

The conductive material is typically added in an amount of 1 to 50 wt % based on the total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The anode binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

On the other hand, the anode is manufactured by coating an anode active material on an anode current collector and drying and pressing the coated anode current collector. As described, a conductive material, a binder, a filler, and the like as described above may be further selectively used in addition to the anode active material.

The anode current collector is generally fabricated to a thickness of 3 to 500 μm. The cathode current collector is not particularly limited so long as it does not cause chemical changes in the fabricated battery and has conductivity. For example, the anode current collector may be aluminum, as described above.

The anode active material may include a lithium metal oxide represented by Formula 3 below:

$$Li_aM'_bO_{4-c}A_c \quad (3)$$

wherein M' is at least one element selected from the group consisting of Ti, Sn, Cu, Pb, Sb, Zn, Fe, In, Al, and Zr; 0.1≤a≤4 and 0.2≤b≤4 in which a and b are determined according to oxidation number of M'; 0≤c<0.2 in which c is determined according to oxidation number of A; and A is at least one monovalent or divalent anion.

The lithium metal oxide may be represented by Formula 4 below:

$$Li_aTi_bO_4 \quad (4)$$

More particularly, the lithium metal oxide may be $Li_{1.33}Ti_{1.67}O_4$ or $LiTi_2O_4$.

However, additionally, carbon such as hard carbon and graphite-based carbon; metal composite oxides such as $Li_xFe_2O_3$ where 0≤x≤1, $Li_xWO_2$ where 0≤x≤1, $Sn_xMe_{1-x}Me'_yO_z$ where Me: Mn, Fe, Pb, or Ge; Me': Al, B, P, Si, Groups I, II and III elements, or halogens; 0<x≤1; 1≤y≤3; and 1≤z≤8; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides; lithium titanium oxides may be used.

In an embodiment, when lithium titanium oxide (LTO) is used as the anode active material, LTO has low electrical conductivity and thus may have the electrode structure described above. In addition, in this case, due to high potential of LTO, a spinel lithium manganese composition oxide having relatively high potential, such as $LiNi_xMn_{2-x}O_4$ where 0.01≤x≤0.6, may be used as the cathode active material.

Batteries formed of spinel lithium manganese composite oxides of such a lithium titanium oxide (LTO) and $LiNi_xMn_{2-x}O_4$ where 0.01≤x≤0.6 as an electrode active material exhibit high-voltages. Thus, corrosion of an Al current collector during charge-discharge processes may be further developed. To prevent this, in the aluminum oxide of the secondary battery according to the present invention, an electrode for a secondary battery formed to a predetermined thickness is used and, as such, even at a high-voltage, corrosion of an Al current collector may be prevented, resulting in superior charge-discharge cycle characteristics.

In addition, the present invention provides an electrode for a secondary battery wherein an electrode mixture including an electrode active material, conductive material and a binder is coated on an Al current collector on which a 40 nm aluminum oxide ($Al_2O_3$) layer is formed. The aluminum oxide layer may be formed to a thickness of particularly 10 to 40 nm, more particularly 20 to 30 nm, as described above.

The electrode active material is a cathode active material or anode active material, or a cathode active material and anode active material. The cathode active material may include a spinel-structure lithium metal oxide represented by Formula 1 below and the anode active material may include an oxide represented by Formula 3 below:

$$Li_xM_yMn_{2-y}O_{4-z}A_z \quad (1)$$

$$Li_aM'_bO_{4-c}A_c \quad (3)$$

wherein 0.9≤x≤1.2 and 0<y<2, 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion.

wherein M' is at least one element selected from the group consisting of Ti, Sn, Cu, Pb, Sb, Zn, Fe, In, Al and Zr;

0.1≤a≤4 and 0.2≤b≤4 in which a and b are determined according to oxidation number of M';

0≤c≤0.2 in which c is determined according to oxidation number of A;

A is at least one monovalent or divalent anion.

The cathode active material and anode active material may be limited to materials described above. Particularly, the cathode active material may be $LiNi_{0.5}Mn_{1.5}O_4$ or $LiNi_{0.4}Mn_{1.6}O_4$ and the anode active material may be $Li_{1.33}Ti_{1.67}O_4$ or $LiTi_2O_4$.

Such an electrode for a secondary battery may be manufactured according to the method described above.

In addition, the present invention provides a secondary battery in which an electrode assembly including the cathode, the anode, and a separator disposed therebetween is impregnated with a lithium salt-containing electrolyte.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, or the like may be used.

The lithium salt-containing electrolyte is composed of an electrolyte and a lithium salt. As the electrolyte, a non-aqueous organic solvent, an organic solid electrolyte, an inorganic solid electrolyte, or the like may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In an embodiment, a lithium salt-containing non-aqueous electrolyte may be prepared by adding a lithium salt such as LiPF$_6$, LiClO$_4$, LiBF$_4$, LiN(SO$_2$CF$_3$)$_2$, or the like to a mixed solvent of a cyclic carbonate such as EC or PC, which is a high dielectric solvent, and a linear carbonate such as DEC, DMC, or EMC, which is a low-viscosity solvent.

The present invention also provides a battery module including the secondary battery as a unit battery and a battery pack including the battery module.

The battery pack may be used as a power source of medium and large devices that require high-temperature stability, long cycle characteristics, high rate characteristics, and the like.

Examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the following examples. These examples are provided only for illustration of the present invention and should not be construed as limiting the scope and spirit of the present invention.

Example 1

The Al current collector was heated to 200° C. under a 50 mTorr oxygen atmosphere for 2 hours to form an aluminum oxide (Al$_2$O$_3$) layer on a surface of the Al current collector A. Thereafter, 90 wt % of LiNi$_{0.5}$Mn$_{1.5}$O$_4$ as a cathode active material), 5 wt % of Super-P as a conductive material and 5 wt % of PVdF as a binder were added to NMP to manufacture a cathode mixture. The cathode mixture was coated on the Al current collector and, as such, a cathode for secondary batteries was manufactured.

Example 2

A cathode for secondary batteries was manufactured in the same manner as in Example 1, except that the Al current collector was heated to 400° C. under a 50 mTorr oxygen atmosphere for 2 hours to form an aluminum oxide (Al$_2$O$_3$) layer on a surface of the Al current collector A.

Example 3

A cathode for secondary batteries was manufactured in the same manner as in Example 1, except that the Al current collector was heated to 200° C. under a 100 mTorr oxygen atmosphere for 2 hours to form an aluminum oxide (Al$_2$O$_3$) layer on a surface of the Al current collector A.

Example 4

A cathode for secondary batteries was manufactured in the same manner as in Example 1, except that the Al current collector was heated to 400° C. under a 100 mTorr oxygen atmosphere for 2 hours to form an aluminum oxide (Al$_2$O$_3$) layer on a surface of the Al current collector A.

Example 5

A cathode for secondary batteries was manufactured in the same manner as in Example 1, except that the Al current collector was heated to 100° C. under a 50 mTorr oxygen atmosphere for 2 hours to form an aluminum oxide (Al$_2$O$_3$) layer on a surface of the Al current collector A.

Example 6

A cathode for secondary batteries was manufactured in the same manner as in Example 1, except that a surface of the Al current collector A was not heated.

Experimental Example 1

Thicknesses and adhesive strengths of cathodes manufactured according to Examples 1 to 6 were measured. Results are shown in Table 1 below:

TABLE 1

| | Thickness of Al$_2$O$_3$ (nm) | Adhesive strength (gf/cm) |
| --- | --- | --- |
| Example 1 | 15 | 38 |
| Example 2 | 20 | 42 |
| Example 3 | 25 | 43 |
| Example 4 | 30 | 49 |
| Example 5 | 10 | 34 |
| Example 6 | 5 | 32 |

As shown in Table 1 above, it can be confirmed that in Examples 1 to 6, reactivity of aluminum and oxygen is high with increasing a temperature and pressure and thus the aluminum oxide layers thicken and, accordingly, adhesive strengths increases with increasing thickness of the aluminum oxide layers.

INDUSTRIAL APPLICABILITY

As described above, a method of manufacturing an electrode for secondary batteries according to the present invention includes surface-treating an Al current collector to form an aluminum oxide (Al$_2$O$_3$) layer having a predetermined thickness and thus may increase a surface area of the current collector and, accordingly, adhesion between the current collector and an electrode active material is enhanced, whereby overall performance of a secondary battery, such as charging and discharging cycle characteristics and the like, may be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing an electrode for a secondary battery comprising an electrode mixture comprising an electrode active material, binder and conductive material coated on an aluminum current collector, the method comprising surface-treating the current collector via thermal treatment at 100 to 500° C. under an oxygen atmosphere of 1 to 150 mTorr to form an aluminum oxide ($Al_2O_3$) layer of 10 nm to 40 nm on the current collector wherein adhesion between the electrode mixture and the current collector is enhanced.

2. The method according to claim 1 comprising treating a surface of the current collector to form an aluminum oxide ($Al_2O_3$) layer of 20 to 30 nm on the current collector.

3. The method according to claim 1, wherein the thermal treatment is performed at 200 to 450° C. under an oxygen atmosphere of 30 to 100 mTorr.

4. The method according to claim 1, wherein an electrode is a cathode or anode, or a cathode and anode.

5. The method according to claim 4, wherein the cathode comprises, as a cathode active material, a spinel-structure lithium metal oxide represented by Formula 1 below:

$$Li_xM_yMn_{2-y}O_{4-z}A_z \quad (1)$$

wherein $0.9 \leq x \leq 1.2$, $0 < y < 2$, and $0 \leq z < 0.2$,

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

6. The method according to claim 5, wherein the lithium metal oxide is represented by Formula 2 below:

$$Li_xNi_yMn_{2-y}O_4 \quad (2)$$

wherein $0.9 \leq x \leq 1.2$, and $0.4 \leq y \leq 0.5$.

7. The method according to claim 6, wherein the lithium metal oxide is $LiNi_{0.5}Mn_{1.5}O_4$ or $LiNi_{0.4}Mn_{1.6}O_4$.

8. The method according to claim 4, wherein the anode comprises, as an anode active material, a lithium metal oxide represented by Formula 3 below:

$$Li_aM'_bO_{4-c}A_c \quad (3)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ in which a and b is determined according to oxidation number of M';

$0 \leq c < 0.2$ in which c is determined according to oxidation number of A; and A is at least one monovalent or divalent anion.

9. The method according to claim 8, wherein the lithium metal oxide is represented by Formula 4 below:

$$Li_aTi_bO_4 \quad (4)$$

wherein $0.5 \leq a \leq 3$ and $1 \leq b \leq 2.5$.

10. The method according to claim 9, wherein the lithium metal oxide is $Li_{1.33}Ti_{1.67}O_4$ or $LiTi_2O_4$.

11. An electrode for a secondary battery comprising an electrode mixture comprising an electrode active material, binder and conductive material coated on an aluminum current collector wherein an aluminum oxide ($Al_2O_3$) layer of greater than or equal to 10 nm and less than 20 nm is formed on the current collector via thermal treatment at 100 to 500° C. under an oxygen atmosphere of 1 to 150 mTorr.

12. The electrode according to claim 11, wherein the electrode active material is a cathode active material or anode active material, or a cathode active material and anode active material wherein the cathode active material comprises a spinel-structure lithium metal oxide represented by Formula 1 below spinel and the anode active material comprises an oxide represented by Formula 3 below:

$$Li_xM_yMn_{2-y}O_{4-z}A_z \quad (1)$$

$$Li_aM'_bO_{4-c}A_c \quad (3)$$

wherein $0.9 \leq x \leq 1.2$, $0 < y < 2$ and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion;

M' is at least one element selected from the group consisting of Ti, Sn, Cu, Pb, Sb, Zn, Fe, In, Al and Zr;

$0.1 \leq a \leq 4$ and $0.2 \leq b \leq 4$ in which a and b are determined according to oxidation number of M';

$0 \leq c < 0.2$ in which c is determined according to oxidation number of A; and A is at least one monovalent or divalent anion.

13. A secondary battery comprising the electrode according to claim 11.

14. The secondary battery according to claim 13, wherein the secondary battery is a lithium secondary battery.

15. A battery module comprising the secondary battery according to claim 14 as a unit battery.

16. A battery pack comprising the battery module according to claim 15.

17. A device comprising the battery pack according to claim 16.

18. The device according to claim 17, wherein the device is an electric vehicle, a hybrid electric vehicle, a plug-in hybrid electric vehicle, or a system for storing power.

19. The method according to claim 1 comprising treating a surface of the current collector to form an aluminum oxide ($Al_2O_3$) layer of greater than or equal to 10 nm and less than 20 nm on the current collector.

* * * * *